(12) United States Patent
Johnson

(10) Patent No.: US 7,691,536 B2
(45) Date of Patent: Apr. 6, 2010

(54) LITHIUM OXYGEN BATTERIES AND METHOD OF PRODUCING SAME

(75) Inventor: Lonnie G. Johnson, Atlanta, GA (US)

(73) Assignee: Excellatron Solid State, LLC, Atlanta, GA (US)

( * ) Notice: Subject to any disclaimer, the term of this patent is extended or adjusted under 35 U.S.C. 154(b) by 1404 days.

(21) Appl. No.: 11/059,942

(22) Filed: Feb. 17, 2005

(65) Prior Publication Data

US 2005/0208353 A1    Sep. 22, 2005

Related U.S. Application Data

(60) Provisional application No. 60/546,683, filed on Feb. 20, 2004.

(51) Int. Cl.
*H01M 6/18* (2006.01)
*H01M 6/24* (2006.01)
*H01M 2/16* (2006.01)

(52) U.S. Cl. .................. 429/322; 429/27; 429/314; 429/246

(58) Field of Classification Search .............. 429/27, 429/246, 231.95, 144, 317, 322
See application file for complete search history.

(56) References Cited

U.S. PATENT DOCUMENTS

| | | | |
|---|---|---|---|
| 3,237,078 A | 2/1966 | Mallory | 320/17 |
| 3,393,355 A | 7/1968 | Whoriskey et al. | 320/18 |
| 4,303,877 A | 12/1981 | Meinhold | 320/6 |
| 4,614,905 A | 9/1986 | Petersson et al. | 320/18 |
| 4,654,281 A | 3/1987 | Anderman | 429/209 |
| 4,719,401 A | 1/1988 | Altmejd | 320/13 |
| 5,270,635 A | 12/1993 | Hoffman et al. | 320/21 |
| 5,291,116 A | 3/1994 | Feldstein | 320/4 |
| 5,314,765 A | 5/1994 | Bates | 429/194 |
| 5,336,573 A | 8/1994 | Zuckerbrod et al. | 429/252 |
| 5,338,625 A | 8/1994 | Bates et al. | 429/193 |
| 5,362,581 A | 11/1994 | Chang et al. | 429/249 |
| 5,387,857 A | 2/1995 | Honda et al. | 320/18 |
| 5,411,592 A | 5/1995 | Ovshinsky et al. | 118/718 |
| 5,445,906 A | 8/1995 | Hobson et al. | 429/162 |
| 5,455,126 A | 10/1995 | Bates et al. | 429/127 |
| 5,512,147 A | 4/1996 | Bates et al. | 204/192.15 |
| 5,561,004 A | 10/1996 | Bates et al. | 429/162 |
| 5,567,210 A | 10/1996 | Bates et al. | 29/623.5 |
| 5,569,520 A | 10/1996 | Bates | 429/162 |
| 5,597,660 A | 1/1997 | Bates et al. | 429/191 |
| 5,612,152 A | 3/1997 | Bates | 429/152 |
| 5,654,084 A | 8/1997 | Egert | 428/215 |
| 5,778,515 A | 7/1998 | Menon | 28/623.4 |
| 5,783,928 A | 7/1998 | Okamura | 320/122 |
| 5,811,205 A | 9/1998 | Andrieu et al. | 429/137 |
| 5,821,733 A | 10/1998 | Turnbull | 320/116 |
| 6,168,884 B1 | 1/2001 | Neudecker et al. | 429/162 |
| 6,387,563 B1 | 5/2002 | Bates | 429/124 |
| 6,413,285 B1 * | 7/2002 | Chu et al. | 29/623.4 |
| 2005/0095506 A1 * | 5/2005 | Klaassen | 429/322 |
| 2005/0100793 A1 * | 5/2005 | Jonghe et al. | 429/246 |

* cited by examiner

*Primary Examiner*—Tracy Dove
(74) *Attorney, Agent, or Firm*—Baker Donelson

(57) ABSTRACT

An air lithium battery (10) is provided having two equal halves (11) that are joined together along a centerline (12). Each half includes a substrate (13), a carbon based cathode (14), a solid electrolyte (15), an anode (16), an anode current collector (17), and end seals (19). The solid electrolyte includes alternating layers of ion conductive glass (21) and ion conductive polymer (22) materials.

27 Claims, 2 Drawing Sheets

LITHIUM OXYGEN BATTERIES AND METHOD OF PRODUCING SAME

REFERENCE TO RELATED APPLICATION

This is a continuation-in-part of U.S. patent application Ser. No. 60/546,683 filed Feb. 20, 2004 and entitled Lithium Air Battery Technology.

TECHNICAL FIELD

This invention relates generally to batteries, and more particularly to lithium oxygen batteries and methods of producing such.

BACKGROUND OF THE INVENTION

Batteries have existed for many years. Recently lithium oxygen or lithium air batteries have been developed as a power supply. These lithium batteries have utilized a polymer electrolyte positioned between the cathode and anode. Batteries using these polymer electrolytes however quickly degrade when exposed to ambient air due to the fact that they do not provide an adequate moisture barrier protection for the lithium anode and thus the lithium anode reacts with moisture and quickly degrades.

As an alternative to polymer electrolytes, lithium air batteries have also utilized glass electrolytes. While these electrolytes provided a moisture barrier the thickness of glass material required for these electrolytes resulted in the glass electrolyte not providing adequate conductivity. The thickness of the glass also makes these electrolytes too brittle.

It thus is seen that a need remains for an electrolyte for a lithium air battery which overcomes problems associated with those of the prior art. Accordingly, it is to the provision of such that the present invention is primarily directed.

SUMMARY OF THE INVENTION

In a preferred form of the invention, a lithium oxygen battery comprises a cathode, an anode, and a solid electrolyte disposed between the cathode and the anode. The solid electrolyte has at least one ion conductive glass layer and at least one ion conductive polymer layer.

In another preferred form of the invention, a solid electrolyte is disclosed for use in a battery which comprises a plurality of ion conductive polymer layers and a plurality of ion conductive glass layers alternating between adjacent pairs of ion conductive polymer layers.

In yet another preferred form of the invention, a method of producing a lithium oxygen battery is disclosed which comprises the steps of providing an electrically conductive fiber matrix, coating the fiber matrix with a polymer, depositing a cathode layer upon the fiber matrix opposite the polymer coating, depositing alternating layers of ion conductive glass and ion conductive polymer upon the polymer coating of the matrix to form a solid electrolyte, depositing an anode upon the solid electrolyte, and mounting an anode terminal in electrical contact with the anode.

DETAILED DESCRIPTION

Figure 3:
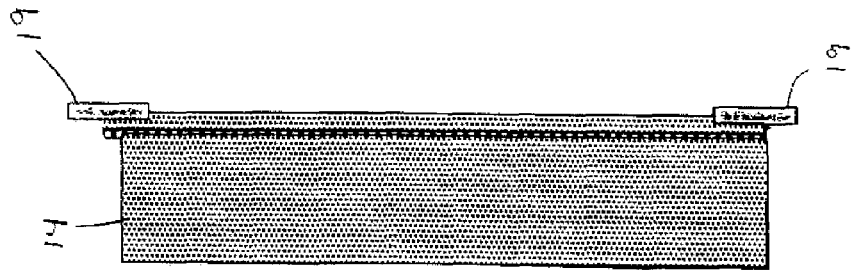
FIGS. 1-5 are a sequential series of cross-sectional views of the manufacturing process of a lithium air battery embodying principles of the invention in a preferred form.

With reference next to the drawings, there is shown in a lithium air or lithium oxygen battery 10 embodying principles of the invention in a preferred form. The battery 10 is essentially two equal halves 11 that are joined together along a centerline 12. Each half 11 includes a substrate 13, a carbon-based cathode 14, a solid electrolyte 15, an anode 16, a cathode current collector 17, a cathode terminal 18, an anode terminal 31, and end seals 19. The terms lithium air and lithium oxygen batteries should be understood to be used interchangeably herein.

The substrate 13 includes an electrically conductive fiber matrix material 20, such as that made of compressed, random carbon fibers, which will be described in more detail hereinafter. The substrate 13 has a material thickness of approximately 3 to 4 mils.

The solid electrolyte 15 is comprised of alternating layers of glass 21 and polymer 22 materials. The glass layer 21 is an ion conductive glass, such a LiPON (lithium phosphorus oxynitride, $Li_xPO_yN_z$). The polymer layer 22 is an ion conductive polymer or polymer electrolyte such as polyethylene oxide (PEO), which includes a lithium salt or the like. The polymer layer 22 has a thickness of approximately 5 microns.

The anode 16 is made of a lithium metal with a thickness of approximately 100 microns.

Figure 2:
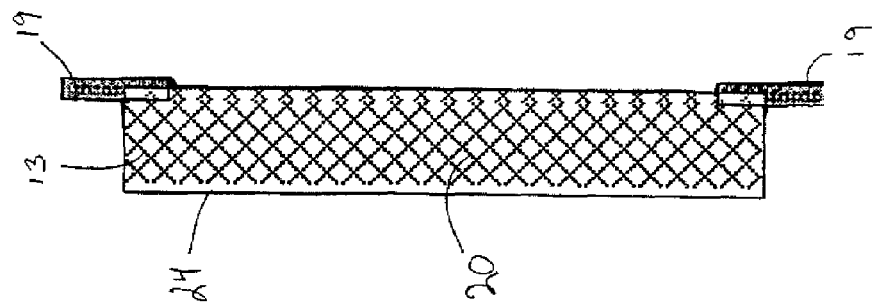

To manufacture the battery 10 the fiber matrix material 20 is laminated with a solvent cured film 24 of polyvinylidene difluoride (PVDF) with dibutyl adipate (DBA). This produces a dimensionally stabilized substrate 13 with one side having the carbon fibers exposed and with the opposite side having the film material exposed, as shown in FIG. 2. The film material also fills the majority of the spaces between the fibers within the matrix material 20. Heat sealable polymer strips or end seals 19 are then laminated to and beyond the peripheral edges of the substrate 13, thereby forming what appears to be a picture frame about the substrate, as shown in FIG. 2.

Next, the cathode 14 is formed by casting a slurry of cathode material made of a combination of carbon, polyvinylidene difluoride (PVDF) and dibutyl adipate (DBA) plasticizer upon the substrate 13. The slurry is cast upon the side of the substrate with solvent cured film 24 exposed, as shown in FIG. 3.

The solid electrolyte 15 is then joined to the substrate 13 opposite the cathode 14. The formation of the electrolyte 15 commences with the deposition of a first coating of polymer electrolyte layer 22, for example a layer of polyethylene oxide (PEO) containing lithium salt or polyvinylidene difluoride (PVDF), upon the fiber matrix exposed side of the substrate 13. The polymer layer 22 may be a cast layer of approximately 5 microns in thickness in order to create a smooth surface.

The partially constructed cell is then submerged in a series of ether, methanol or similar baths and lithium salts to remove the DBA plasticizer from the cathode and substrate. This results in a porous cathode 14 while the first coating of polymer layer 22 remains non-porous.

Figure 4:
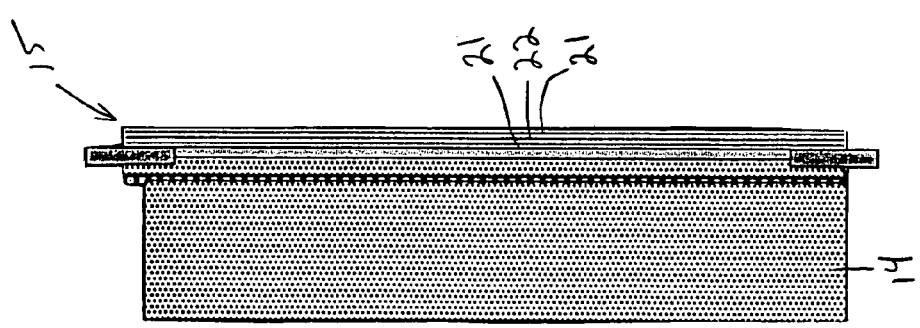

An ion conductive glass electrolyte layer 21, such as a LiPON glass layer, is then deposited upon the polymer electrolyte layer 22. The glass layer 21 may be sputtered onto the polymer layer in conventional fashion. Additional, alternating series of polymer layers 22 and glass layers 21 may then be deposited to form a stack of polymer and glass layers, as shown in FIG. 4. The number and thickness of the layers depend upon the use and desired operational parameters of the battery. However, while one layer of each material would work as an electrolyte, it is believed that by having at least two} layers of each material the formation of any pinholes in one glass layer will not line up with pinholes in a subsequent glass layer, thus a performance degrading pinhole does not extend completely through the entire electrolyte thereby limiting the damaging effect of such.

Figure 5:
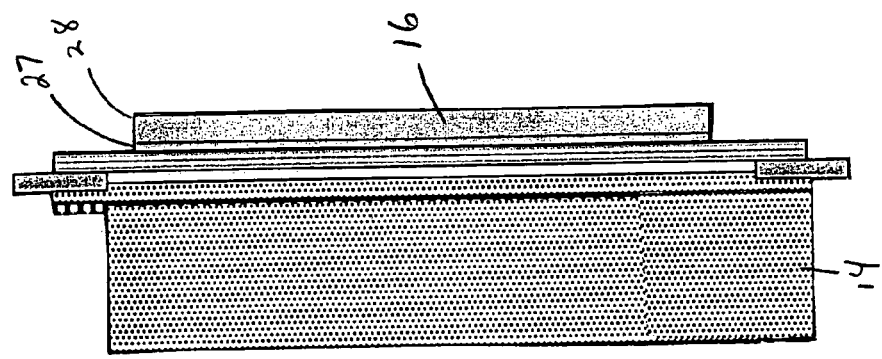

An approximately 2 micron thick layer of lithium metal 27 is then vapor deposited upon the top layer of the solid electrolyte 15. A thicker layer of lithium metal foil 28, approximately 100 microns in thickness, is then laminated to the thin layer 27, as shown in FIG. 5. It should be understood that the time, temperature and pressure of the lamination process should be selected so that the lithium foil 28 is laminated to the thin layer of lithium metal 27, but also such that the pores within the substrate 13 do not close. It is believed that a temperature of approximately 100 degrees Celsius and pressure of approximately 0.5 p.s.i. for a period of 10 to 20 minutes should accomplish this task. This step completes the construction process of one half 11 of the battery 10.

Figure 1:
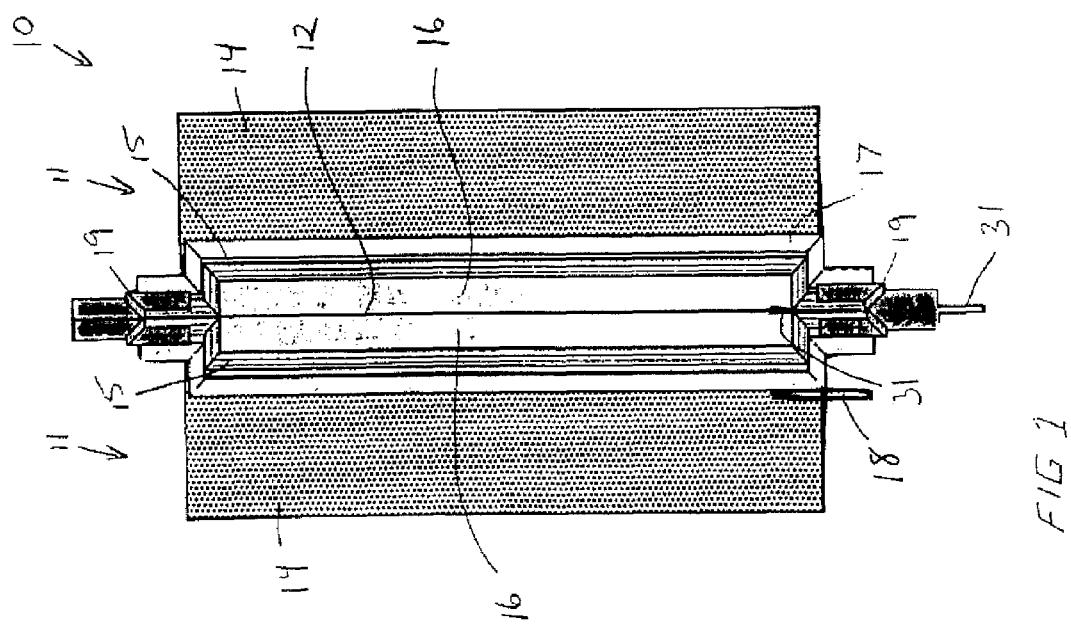

To complete that battery 10 two similarly constructed halves 11 are positioned against each other anode 16 to anode 16 along centerline 12 with a negative terminal 31 positioned therebetween along one peripheral edge, as shown in FIG. 1. The two halves 11 are then laminated to each other in the same manner as previously described with regard to the lamination of the lithium foil 28. It should be noted that the heat sealable polymer strips 25 are sealed to each other, thereby sealing the exposed side edges of the anode 16 and solid electrolyte 15. The sealing of the side edges limits moisture from entering the cell through the side edges.

A measured amount of liquid electrolyte is then applied to the cathodes 14. The liquid electrolyte may be one mole of LiTFSI [Lithium bis (trifluoromethansulfonyl) imide] in 1-Ethyl-3-methylimidazolium bis (trifluoromethylsulfonyl) imide (EMIMBMeI); one mole of LiTFSI [Lithium bis (trifluoromethansulfonyl) imide] in 1-Ethyl-3-methylimidazolium bis (pentafluoroethylsulfonyl) imide (EMIMBeTi); or a mixture of LiTFSI [Lithium bis (trifluoromethansulfonyl) imide] and Acetamide in 1:4 molar ratio. The liquid electrolyte fills the larger pores within the cathode.

It should be understood that if a non-conductive matrix is utilized as an alternative to the conductive matrix of the preferred embodiment, the battery cell includes an additional current collector, such as a conductive mesh, between the substrate 13 and the cathode 14.

The just described invention creates a lithium air battery with an electrolyte system that provides excellent barrier protection of the lithium anode from moisture. The overall barrier is pinhole free and is not brittle. It should be understood that as used herein the term deposited is intended to encompass all known methods of depositing layers, such as by chemical evaporation, thermal evaporation, sputtering, laser ablation or other conventionally known methods. It should also be understood that while the preferred embodiment shows a battery made of two halves, each half may be considered a complete battery. Obviously, this formation would require additional sealing of the battery components.

It thus is seen that a lithium air battery is now provided with a solid electrolyte that will prevent the passage of moisture but will allow the efficient passage of ions. It should of course be understood that many modifications may be made to the specific preferred embodiment described herein, in addition to those specifically recited herein, without departure from the spirit and scope of the invention as set forth in the following claims.

The invention claimed is:

1. A lithium oxygen battery comprising:
   a first cathode;
   an anode; and
   a first solid electrolyte disposed between said first cathode and said anode, said first solid electrolyte having at least one ion conductive glass layer and at least one ion conductive polymer layer.

2. The lithium oxygen battery of claim 1 wherein said first cathode is porous.

3. The lithium oxygen battery of claim 2 wherein said porous first cathode contains a liquid electrolyte.

4. The lithium oxygen battery of claim 1 further comprising a second solid electrolyte mounted to said anode opposite said first solid electrolyte.

5. The lithium oxygen battery of claim 4 further comprising a second cathode mounted to said second solid electrolyte opposite said anode.

6. The lithium oxygen battery of claim 1 wherein said first solid electrolyte comprises a plurality of ion conductive glass layers and a plurality of ion conductive polymer layers, said glass layers and said polymer layers being alternating in series.

7. The lithium oxygen battery of claim 6 wherein said glass layers are made of lithium phosphorus oxynitride.

8. The lithium oxygen battery of claim 7 wherein said polymer layers are made of polyethylene oxide.

9. The lithium oxygen battery of claim 6 wherein said polymer layers are made of polyethylene oxide.

10. The lithium oxygen battery of claim 1 wherein said first cathode includes an electrically conductive fiber matrix material.

11. A lithium oxygen battery comprising:
    a first cathode;
    an anode; and
    a first solid electrolyte disposed between said first cathode and said anode, said first solid electrolyte having alternating layers of ion conductive glass and ion conductive polymer.

12. The lithium oxygen battery of claim 11 wherein said first cathode is porous.

13. The lithium oxygen battery of claim 12 wherein said porous first cathode contains a liquid electrolyte.

14. The lithium oxygen battery of claim 11 further comprising a second solid electrolyte mounted to said anode opposite said first solid electrolyte.

15. The lithium oxygen battery of claim 14 further comprising a second cathode mounted to said second solid electrolyte opposite said anode.

16. The lithium oxygen battery of claim 11 wherein said glass layers are made of lithium phosphorus oxynitride.

17. The lithium oxygen battery of claim 16 wherein said polymer layers are made of polyethylene oxide.

18. The lithium oxygen battery of claim 11 wherein said polymer layers are made of polyethylene oxide.

19. The lithium oxygen battery of claim 11 wherein said first cathode includes an electrically conductive fiber matrix material.

20. A solid electrolyte for use in a battery comprising a plurality of ion conductive polymer layers and a plurality of ion conductive glass layers alternating between adjacent pairs of ion conductive polymer layers.

21. The solid electrolyte of claim 20 wherein the glass layers are made of lithium phosphorus oxynitride.

22. The solid electrolyte of claim 21 wherein the polymer layers are made of polyethylene oxide.

23. The solid electrolyte of claim 20 wherein the polymer layers are made of polyethylene oxide.

24. A method of producing a lithium oxygen battery comprising the steps of:

providing an electrically conductive fiber matrix;

coating the fiber matrix with a polymer;

depositing a cathode layer upon the fiber matrix opposite the polymer coating;

depositing alternating layers of ion conductive glass and ion conductive polymer upon the polymer coating of the matrix to form a solid electrolyte;

depositing an anode upon the solid electrolyte; and mounting an anode terminal in electrical contact with the anode.

25. The method of claim 24 wherein the glass layers are made of lithium phosphorus oxynitride.

26. The method of claim 25 wherein the polymer layers are made of polyethylene oxide.

27. The method of claim 24 wherein the polymer layers are made of polyethylene oxide.

* * * * *